(12) United States Patent
Fu et al.

(10) Patent No.: US 8,797,640 B2
(45) Date of Patent: Aug. 5, 2014

(54) METHOD OF PERFORMING TARGET RAMAN GAIN LOCKING AND RAMAN FIBER AMPLIFIER

(75) Inventors: Chengpeng Fu, Wuhan (CN); Peng Zhang, Wuhan (CN); Yi Jiang, Wuhan (CN); Chunping Yu, Wuhan (CN); Cuihong Zhang, Wuhan (CN)

(73) Assignee: Accelink Technologies Co., Ltd, Wuhan, Hubei Province (CN)

( * ) Notice: Subject to any disclaimer, the term of this patent is extended or adjusted under 35 U.S.C. 154(b) by 175 days.

(21) Appl. No.: 13/323,455

(22) Filed: Dec. 12, 2011

(65) Prior Publication Data

US 2012/0327505 A1 Dec. 27, 2012

(30) Foreign Application Priority Data

Jun. 24, 2011 (CN) .......................... 2011 1 0174019

(51) Int. Cl.
*H04B 10/17* (2006.01)
*H01S 3/30* (2006.01)
*H04B 10/12* (2006.01)

(52) U.S. Cl.
USPC .................................... 359/334; 359/341.41

(58) Field of Classification Search
CPC ........................... H01S 3/302; H04B 10/2916
USPC ............................................ 359/334, 341.41
See application file for complete search history.

(56) References Cited

U.S. PATENT DOCUMENTS

| | | | |
|---|---|---|---|
| 5,790,301 A * | 8/1998 | Maeda et al. .................. | 359/337 |
| 5,818,629 A * | 10/1998 | Kinoshita ................. | 359/337.11 |
| 6,519,082 B2 * | 2/2003 | Ghera et al. ............... | 359/341.4 |
| 6,785,042 B1 * | 8/2004 | Onaka et al. .................. | 359/334 |
| 2002/0041431 A1 * | 4/2002 | Ohshima et al. .............. | 359/334 |
| 2005/0024712 A1 * | 2/2005 | Hiraizumi et al. ............ | 359/334 |
| 2005/0099676 A1 * | 5/2005 | Tokura et al. ................. | 359/349 |
| 2007/0258132 A1 * | 11/2007 | Zhou et al. .................... | 359/334 |
| 2011/0141552 A1 | 6/2011 | Ghera et al. | |

FOREIGN PATENT DOCUMENTS

| | | |
|---|---|---|
| CN | 1334484 A | 2/2002 |
| CN | 1379279 A | 11/2002 |
| CN | 1412616 A | 4/2003 |
| CN | 101414731 A | 4/2009 |
| CN | 101552428 A | 10/2009 |
| CN | 101789829 A | 7/2010 |

\* cited by examiner

*Primary Examiner* — Eric Bolda (74) *Attorney, Agent, or Firm* — Birch, Stewart, Kolasch & Birch, LLP (57) ABSTRACT

An embodiment of the present invention discloses a method of performing target Raman gain locking and a Raman fiber amplifier. The Raman fiber amplifier comprises a coupler (1) and a control unit (15), wherein the control unit comprises a target gain locking module. A detection circuit formed by filters and optical power detectors is connected between an output side of the coupler (1) and an input side of the control unit (15). Said method uses the control unit (15) to adjust power of the pump laser, making the detected out-of-band ASE power value reach target out-of-band ASE optical signal power value. Thus, the target amplification gain locking can be realized. Optical path according to embodiments of the present invention has a simple structure. The Raman gain can be configured flexibly according to line condition, and automatic control and locking of gain of the Raman fiber amplifier can be realized.

16 Claims, 3 Drawing Sheets

METHOD OF PERFORMING TARGET RAMAN GAIN LOCKING AND RAMAN FIBER AMPLIFIER

BACKGROUND

The embodiments of the present invention relate to communication field, and particularly relate to a method of performing target Raman gain locking and a Raman fiber amplifier.

Distributed Raman fiber amplifier has been widely applied in communication system now. Since gain medium of the distributed Raman fiber amplifier is transmission fiber itself, input power into a Raman pumping module cannot be monitored in real time. Signal power into the Raman pumping module can be monitored only in case that pump is powered OFF. If a pump laser the Raman pumping module is in a ON state, signal power into the Raman pumping module is amplified power, that is, the pumping module cannot detect both of the input power in case that pump is powered OFF and the signal power in case that pump is powered ON. Therefore, the gain control in the distributed Raman fiber amplifier cannot be performed as conventional EDFA that performs the gain control by comparing input and output powers.

In past, input power of the distributed Raman fiber amplifier is small mostly. Since a power of a saturated input signal is high, the Raman fiber amplifier in past mostly operates in linear amplification region of small signal. As long as the power level of the pump is fixed, gain is nearly constant as input power varies in small signal region. However, since broadband is growing fast, demand for high bandwidth is increasing, thus operators upgrade number of wavelengths continuously. As a result, power into the Raman fiber amplifier is greatly increased, the Raman fiber amplifier operates at knee point of linear gain region and saturated gain region. Thus, in order to avoid influence on the gain by uplink and downlink channels, it is necessary to introduce Raman gain locking. Also, in practice of the distributed Raman fiber amplifier, different user may deal with different kinds of optical fibers such as SMF-28, Leaf; Truewave fibers and so on. Fibers of same kind may even have different attenuation coefficients due to different batches, which result in large gain error when pump power is constant or drive current is constant. In consideration of influence by aging over time and change of ambient temperature of fiber, loss factor of the fiber become larger, thus Raman gain is decreased. During engineering installation, different node loss may cause large gain error (pump power is constant). During construction, cross parts with different length may exist. For flexible application, variable Raman gain is requirement for system. In view of above, it is necessary for system to perform gain locking on Raman fiber amplifier and realize adjustable gain.

Erbium Doped Fiber Amplifier (EDFA) realizes amplification of signal by energy level transition. Thus, ASE of EDFA is greatly influenced by absence/presence of signal input. However, in the distributed Raman fiber amplifier, amplification process is realized by nonlinear effect stimulated Raman scattering without energy level transition, in which ASE power level of the distributed Raman fiber amplifier is irrelevant of absence/presence of signal light. In case of fixed Raman gain, ASE power level of the Raman fiber amplifier will remain unchanged. Since ASE in operation band is superposed with signal, in-band ASE power cannot be monitored, while out-of-band ASE power can be monitored. Therefore, Raman gain locked can be realized by controlling power level of out-of-band ASE optical signal. In order to obtain different groups of Raman gains, it needs to obtain different groups of out-of-band ASE power levels. Thus, the distributed Raman fiber amplifier with adjustable gain is technologically practical.

Chinese patent CN1412616A disclosed a method of performing gain locking by ASE, in which a combination of several BPFs and photoelectric detectors for detecting around different wavelength is added at 5% of detecting position of signal light, to detecting ASE optical signal power at different frequencies. Then dynamically control in real time of Raman gain of the Raman fiber amplifier can be realized by controlling the magnitudes of ASE optical signal powers on those points. The method has two disadvantages on value-sampling of ASE as following: 1) if the value is sampled on operation wavelength, bandwidth is not broad enough, thus obtained ASE power value is relative small, accuracy of gain may be greatly influenced by dark current of PIN; and 2) if the ASE value is sampled on operation wavelength, although BPF is standard channel of non ITU-T, ASE power may be greatly influenced by SSE of light source itself; in particular, for 40 Gbit/s and 100 Gbit/s signals modulated with DPSK and with broad signal bandwidth, much of base SSE power may interfere with value-sampling region of ASE; further, it cannot be avoided that ASE power will be generated from EDFA in system cascading, which cannot be prevented. Above two disadvantages may limit the practicality of the technology. Moreover, in said patent, gain locking is performed only on a fixed gain, it cannot realize variable gain.

Chinese patent CN101552428A disclosed a technology and device for realizing signal power detection and ASE compensation according to ASE power outside the operation band and ASE and signal powers within the operation band, in which detection of in-band ASE power is performed by means of power of out-of-band ASE optical signal, thus monitoring of signal power is realized, while ASE power is not used for gain locking and adjustment. Further, in the solution, influence on entire signal power detection by out-of-band ASE light of EDFA itself is not considered, in that the main object of the patent is to solve the problem of pump off in case of fiber breakage or absence of signal light. Out-of-band ASE light of EDFA itself in the system has little influence on it, because in case of fiber breakage or absence of signal light, EDFA itself does not output ASE power.

SUMMARY

An object of embodiments of the present invention is to overcome the problem and shortage in prior art, and provide a method of performing target Raman gain locking and a Raman fiber amplifier which can realizing the target Raman gain locking.

A solution according to embodiments of the present invention is that: a method of performing target Raman gain locking, comprising: step 1 of extracting an optical signal from an output side of a coupler of a Raman fiber amplifier; step 2 of performing a first-level-bandpass filtering on the optical signal extracted in the step 1, splitting composite out-of-band optical signal and composite in-band optical signal with respect to the filtering operation band; step 3 of performing a second-level-bandpass filtering on the composite out-of-band optical signal split in step 2 to filter out monitoring optical signal therein and extract out-of-band ASE optical signal; step 4 of detecting power of out-of-band ASE optical signal extracted in the step 3; step 5 of determining a mathematical relation between target gain value and the power of out-of-band ASE optical signal generated from Raman gain itself; step 6 of determining a standard power of out-of-band ASE optical signal to remove interference; step 7 of adjusting power of a pump laser of the Raman fiber amplifier by a control unit of the Raman fiber amplifier, to make the power of out-of-band ASE optical signal detected in step 4 be equal to and locked to the standard power of out-of-band ASE optical signal.

The step 6 comprises substeps as follows: step 6-1 of in case that the Raman fiber amplifier is powered ON and the pump laser thereof is powered OFF, performing the steps 1 to 4, obtaining the power of out-of-band ASE optical signal, and at same time, detecting power Pin of the split composite in-band optical signal; step 6-2 of comparing the power Pin of the composite in-band optical signal and a signal light loss threshold value of the Raman fiber amplifier, and controlling the OFF and ON of the pump laser of the Raman fiber amplifier by the control unit of the Raman fiber amplifier, wherein when the power Pin of the composite in-band optical signal is smaller than the signal light loss threshold value of the Raman fiber amplifier, the pump laser remaining OFF state, otherwise the pump laser being powered ON; step 6-3 of determining mathematical correspondence relation between target gain value of the Raman fiber amplifier and the average out-of-band gain value; step 6-4 of determining the average out-of-band gain value corresponding to the target gain value according to the mathematical correspondence relation determined in step 6-3, and multiplying it by the power of out-of-band ASE optical signal obtained in the step 6-1, thus obtaining a first amendment value; step 6-5 of adding the first amendment value obtained in the step 6-4 and the power of out-of-band ASE optical signal corresponding to the target gain value obtained from the mathematical relation determined in the step 5, thus obtaining the standard power of out-of-band ASE optical signal.

The step 6 further comprises substeps as follows: step 6-1 of in case that the Raman fiber amplifier is powered ON and the pump laser thereof is powered OFF, performing the steps 1 to 4, obtaining the power of out-of-band ASE optical signnal, and at same time, detecting power Pin of the split composite in-band optical signal; step 6-2 of comparing the power Pin of the composite in-band optical signal and a signal light loss threshold value of the Raman fiber amplifier, and controlling the OFF and ON of the pump laser of the Raman fiber amplifier by the control unit of the Raman fiber amplifier, wherein when the power Pin of the composite in-band optical signal is smaller than the signal light loss threshold value of the Raman fiber amplifier, the pump laser remaining OFF state, otherwise the pump laser being powered ON; step 6-3 of determining mathematical correspondence relation between target gain value of the Raman fiber amplifier and the average out-of-band gain value; step 6-4 of determining the average out-of-band gain value corresponding to the target gain value according to the mathematical correspondence relation determined in step 6-3, and multiplying it by the power of out-of-band ASE optical signal obtained in the step 6-1, thus obtaining a first amendment value; step 6-5 of determining a mathematical correspondence relation between the power Pin of the composite in-band optical signal obtained in the step 6-1 and in-band/out-of-band isolation degree i; step 6-6 of obtaining a second amendment value $$10^{\frac{P_{in}-i}{10}}$$

according to the mathematical correspondence relation determined in step 6-5; step 6-7 of adding the first amendment value obtained in the step 6-4, the second amendment value obtained in the step 6-6 and the power of out-of-band ASE optical signal corresponding to the target gain value obtained from the mathematical relation determined in the step 5, thus obtaining the standard power of out-of-band ASE optical signal.

The Raman fiber amplifier comprises a coupler and a control unit, a detection circuit formed by filters and optical power detectors is connected between an output side of the coupler and an input side of the control unit, wherein a common side of a signal filter is connected to a small terminal of the output side of the coupler, a reflection side thereof is connected to a common side of a monitoring channel filter, a reflection side of the monitoring channel filter is connected to reception side of a first optical power detector, an output side of the first optical power detector is connected to an input side of the control unit, the control unit comprises a target gain locking module.

A second optical power detector is connected between a transmission side of the signal filter and the input side of the control unit.

The target gain locking module comprises a first storage and conversion unit for storing and converting the mathematical relation between the target gain value and the power of out-of-band ASE optical signal generated from Raman gain itself; ON/OFF control unit of the pump laser; a second storage and conversion unit for storing and converting a mathematical relation between signal power outside operation band when the pump is powered OFF detected by the first optical power detector and the first amendment value; a standard out-of-band ASE optical signal power calculation unit for adding the power of out-of-band ASE optical signal corresponding to the target gain value and the first amendment value; and a power adjustment and power locking unit of the pump laser.

The target gain locking module comprises a first storage and conversion unit for storing and converting the mathematical relation between the target gain value and the power of out-of-band ASE optical signal generated from Raman gain itself; ON/OFF control unit of a pump laser; a second storage and conversion unit for storing and converting a mathematical relation between signal power outside operation band when the pump is powered OFF detected by the first optical power detector and the first amendment value; a third storage and conversion unit for storing and converting a mathematical relation between partial power of signal power within the operation band detected by the second optical power detector interfered with the first optical power detector and the second amendment value; a standard out-of-band ASE optical signal power calculation unit for adding the power of out-of-band ASE optical signal corresponding to the target gain value, the first amendment value and the second amendment value; and a power adjustment and power locking unit of the pump laser.

The signal filter and the monitoring channel filter may be BPF.

An operation band of the signal filter may be the operation band of the Raman fiber amplifier.

An operation band of the monitoring channel filter may be an operation band with filtering out a monitoring signal.

Multiple signal filters (2-1, 2-2, . . . 2-*n*) are connected in series between the reflection side of the signal filter and the common side of the monitoring channel filter. A common side of each signal filter is connected to a reflection side of a signal filter of previous stage, and each signal filter has same operation band.

The method of performing target Raman gain locking and a Raman fiber amplifier according to embodiments of the present invention have advantages as following:

1. According to ASE power sampling method according to embodiments of the present invention, the Raman fiber amplifier is subjected to gain locking. The ASE power according to embodiments of the present invention has a wide range of value-sampling, has large power of value-sampling, and is less influenced by dark current of optical detector;
2. ASE power sampling point is far from operation wavelength of the Raman fiber amplifier, thus is less influenced by spontaneous radiation SSE amplified by system signal itself;
3. Optical path according to embodiments of the present invention has a simple structure, is easily realized, and cost thereof can be lowered while increasing product performance; and
4. The Raman gain can be configured flexibly according to line condition, and automatic control of gain of the Raman fiber amplifier can be realized.

BRIEF DESCRIPTION OF THE DRAWINGS

The present invention will become more fully understood from the detailed description given hereinafter and the accompanying drawings which are given by way of illustration only, and thus are not limitative of the present invention and wherein.

REFERENCE NUMERALS

1: splitting coupler
2: signal filter
2-1: first signal filter
2-$n$: nth signal filter
3: pump laser group
4: pump signal combiner
5: first optical detector
6: second optical detector
7: monitoring channel filter
8: DWDM signal group
9: Erbium Doped Fiber Amplifier (EDFA)
10: transmission fiber
15: control unit
11: spectral region within operation band of signal BPF
12: ASE short wavelength region outside operation band of signal BPF
13: ASE long wavelength region outside operation band of signal BPF
14: spectrum of filtered out OSC signal

DETAILED DESCRIPTION

The embodiments of the present invention will be further described with respect to accompanying and examples.

Figure 1:
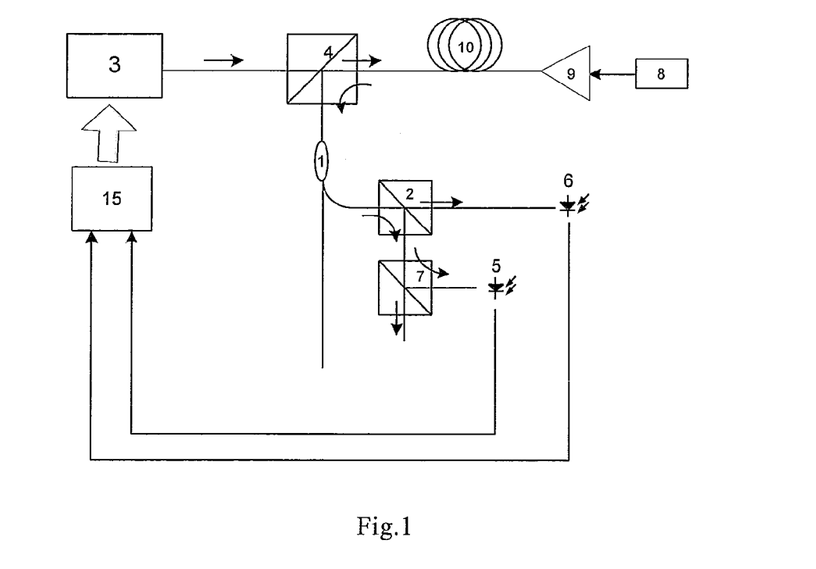
FIG. 1 is a structure diagram of a device which realizes automatic gain control of the Raman fiber amplifier according to an embodiment of the present invention.

FIG. 1 illustrates a distributed Raman fiber amplifier which realizes the target Raman gain locking according to an embodiment of the present invention. An output side of a pump laser group 3 is connected to a pump side of a pump signal combiner 4, a common side of the of pump signal combiner 4 is connected to transmission fiber, a signal side of the pump signal combiner 4 is connected to a input side of a splitting coupler 1. The splitting coupler can employ splitting ratio of 10/90 or other ratio. A large splitting side of the splitting coupler 1 is used as signal output side, a small splitting side thereof is connected to a common side of a signal filter 2, a reflection side of the signal filter 2 is connected to a common side of a monitoring channel filter 7, a reflection side of the monitoring channel filter 7 is connected to a first optical detector 5, a transmission side of the monitoring channel filter 7 is OSC (optical supervisory channel) signal output side. A transmission side of the signal filter 2 is connected to a second optical detector 6, a control unit 15 is connected to the first optical detector 5 and the second optical detector 6 respectively.

The signal filter 2 splits input signal into composite out-of-band optical signal and composite in-band optical signal with respect to the filter operation band. The composite in-band optical signal contains in-band signal and in-band ASE light. The composite out-of-band optical signal contains out-of-band ASE light and OSC (optical supervisory channel) signal light. A monitoring channel filter 7 with band outside the operation band of the signal filter 2 is added for filtering, which may suppress influence on the out-of-band ASE of the Raman fiber amplifier by signal power (i.e., OSC signal) in optical monitoring channel effectively. The first optical detector 5 operates to detect optical power of the out-of-band ASE light which passes through the signal filter 2 and the monitoring channel filter 7 in sequence. The second optical detector 6 operates to detect optical power of the in-band ASE light and in-band signal light within the operation wavelength range of the signal filter 2 (that is, the composite in-band optical signal).

According to the embodiment of the present invention, power locking is performed based on the out-of-band ASE light, thus the gain of the Raman fiber amplifier does not change as ambient environmental condition changes, that is, in various fibers such as SMF-28, Leaf, Truewave fibers and so on, a preset gain can be attained without adjusting pump power manually. In case of the influence by fiber aging and change of ambient temperature, the Raman gain can be maintained as a preset value, which improves generality and convenience of the Raman fiber amplifier. A distributed Raman fiber amplifier with variable target gain can be realized according to a relation list of the Raman gain and the out-of-band ASE optical signal power, and a relation list of the Raman gain and the average out-of-band gain stored in the control unit.

Figure 5:
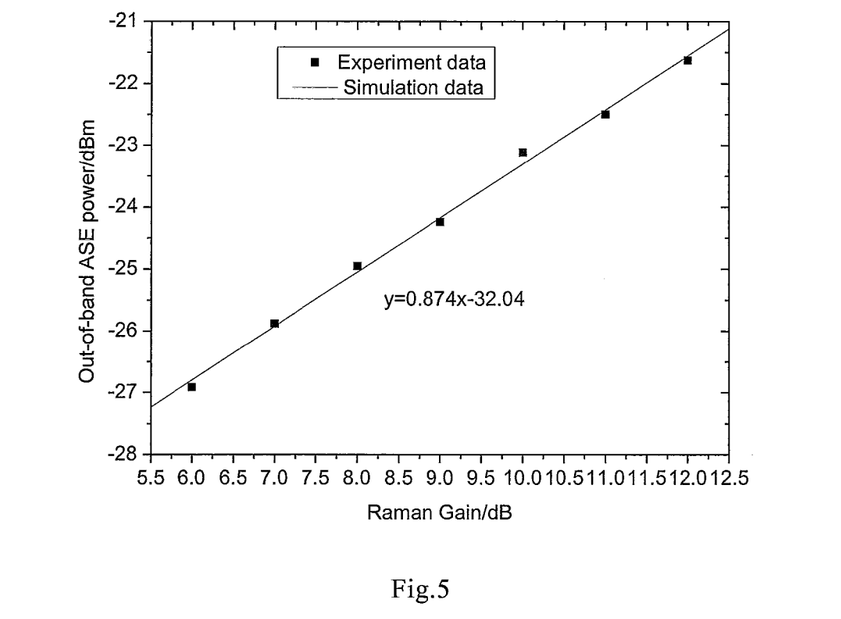
FIG. 5 is a graphical diagram illustrating relation between Raman gain and out-of-band ASE power generated from the Raman gain itself.

According to the embodiment of the present invention, the relation between the Raman gain and the out-of-band ASE optical signal power generated from the Raman gain itself is determined as one-to-one correspondence relation by a listing method, or is stored in the control unit by a method of establishing functional relation. The listing is realized in manner of scaling. After determining the one-to-one correspondence relation between the Raman gain and the out-of-band ASE optical signal power generated from the Raman gain itself in manner of scaling, a functional relation between the gain of the Raman fiber amplifier and the out-of-band ASE optical signal power generated from the Raman gain itself is established by least square linear fitting or interpolation method or other fitting method, as shown in FIG. 5. The control unit can set gain value according to the relation between the gain of the Raman fiber amplifier and the out-of-band ASE optical signal power generated from the Raman gain itself to adjust pump power automatically, thus making the out-of-band ASE optical signal power be the out-of-band ASE optical signal power generated from the Raman gain itself corresponding to target gain value.

Figure 3:
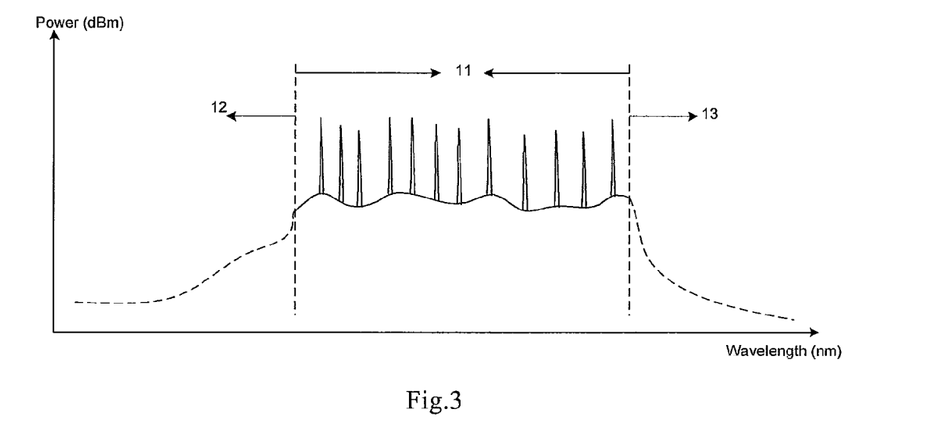
FIG. 3 is a spectral diagram when or after a system with EDFA amplifier is entering the Raman fiber amplifier.

According to the embodiment of the present invention, target Raman gain locking is performed as follows: in practice, the DWDM signal group 8 is amplified by the Erbium Doped Fiber Amplifier 9, then enters the pump signal combiner 4 via the transmission fiber 10, after that, all of the signal light and ASE light enter coupler 1, signal light is output from the large terminal of the coupler. A minor of the signal light and the ASE light enters the signal filter 2 via the small terminal of the coupler 1, then the signal filter 2 splits said signal light and the ASE light into signal terminal of transmission side and signal terminal of reflection side. The signal terminal of transmission side comprises in-band signal and in-band ASE light, that is, composite in-band optical signal. According to the embodiment of the present invention, determination of in-band signal and out-of-band signal is performed by dividing with respect to filter band. At this time, the composite in-band optical signal means signal light and ASE light within the operation wavelength range of the signal filter 2, spectrum thereof is shown in FIG. 3 as spectral region 11 within the operation band of the signal filter 2. The spectrum outside the operation band is shown in FIG. 3 as spectral line in ASE short wavelength region 12 outside the operation band of the signal filter 2 and ASE long wavelength region 13 outside the operation band of the signal filter 2. The signal of reflection side of the signal filter 2 comprises out-of-band signal and out-of-band ASE, i.e., the composite out-of-band optical signal, of which out-of-band signal functions to monitor in transmission system, that is, OSC (optical supervisory channel) signal. The signal of reflection side of the signal filter 2, that is, the composite out-of-band optical signal is filtered by the monitoring channel filter 7, thus filtering out the OSC signal. According to the embodiment of the present invention, the OSC signal is not used. The reflection side of the monitoring channel filter 7 is the out-of-band ASE light, the power of the out-of-band ASE optical signal is detected by the first optical detector 5. When detected value by the first optical detector 5 reaches a gain, the control unit 15 can find ASE power value corresponding to target gain, according to the list relation or functional relation between the gain and the out-of-band ASE power generated from the Raman gain itself stored therein. The control unit 15 starts to drive controlling, so as to maintain the out-of-band ASE power as the found out-of-band ASE power level, thus realizing gain locking of the Raman fiber amplifier. When the gain of the Raman fiber amplifier changes, the control unit 15 can adjust pump power of pump, according to the list relation or functional relation between the gain and the out-of-band ASE power generated from the Raman gain itself pre-stored in the control unit 15, thus making the out-of-band ASE power value reach a power level in case of new gain requirement, and realizing target gain locking.

Figure 4:
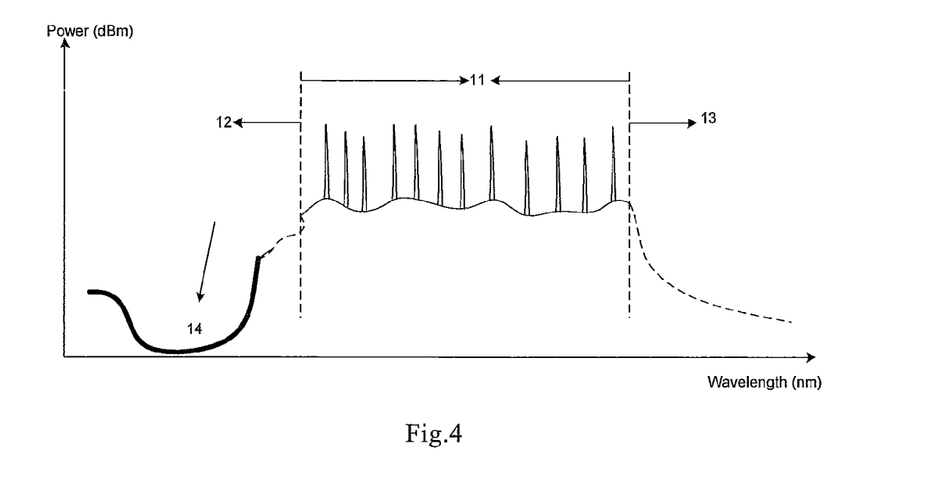
FIG. 4 is a spectral diagram after a BPF for filtering out OSC signal is added in out-of-band ASE region.

As shown in FIG. 3, composite out-of-band signal spectral line through the signal filter lies on the ASE short wavelength region 12 outside the operation band of the signal filter and the ASE long wavelength region 13 outside the operation band of the signal filter. As shown in FIG. 4, OSC signal band part filtered out by the monitoring channel filter 7 is removed from the ASE short wavelength region 12 outside the operation band of the signal filter, thus obtaining spectrum 14 of filtered out OSC signal in FIG. 4, with remaining spectral line of out-of-band ASE optical region.

According to the embodiment of the present invention, the signal filter 2 can be but not limited to a BPF, it can also be other kind of filter with band corresponding to the operation band of the Raman fiber amplifier. The monitoring channel filter 7 can be a BPF, it can also be a kind of filter other than BPF, as long as said filter can realize the function of filtering out the OSC monitoring signal.

According to the embodiment of the present invention, the first optical detector 5 mainly functions to detect optical power of ASE optical source outside the operation band of the signal filter 2 and the monitoring channel filter 7. However, detection accuracy of the optical detector is influenced by two parts of optical power, of which one part is out-of-band ASE light generated from EDFA itself in system which may be amplified by the Raman fiber amplifier, influence on system by the out-of-band ASE generated from EDFA need to be avoided. The other part is a part of in-band signal interfered with out-of-band.

Figure 6:
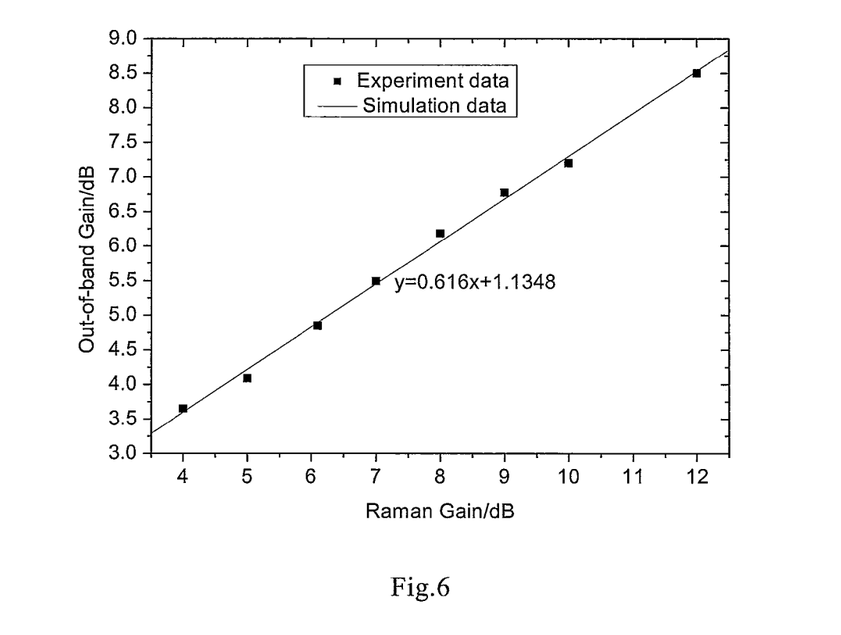
FIG. 6 is a graphical diagram illustrating relation between Raman signal gain and average out-of-band gain.

Amplification gains are different on various wavelengths outside the operation band of the Raman fiber amplifier, while ASE light outside the operation band is of a broad spectrum rather than a certain wavelength. In the broad range, gains on each point are not same. Thus, average gain can be used to describe gain of entire out-of-band spectrum. Because of the out-of-band ASE light generated from EDFA itself in system which is amplified by the Raman fiber amplifier with average out-of-band gain of the Raman fiber amplifier in case of a certain Raman gain. In case of different Raman gains, the average out-of-band gains of the Raman fiber amplifier are different. According to the embodiment of the present invention, influence on Raman gain control by out-of-band ASE from EDFA itself in system can be removed by following steps:

1) the pump power cannot be powered ON immediately when the Raman fiber amplifier is powered ON. Firstly, the control unit 15 samples out-of-band ASE power of EDFA in system which enters the Raman fiber amplifier in the system, that is, the power value detected by the first optical detector 5. Then the value is stored in the control unit 15;
2) it is determined whether the pump will be powered ON, according to the comparison between optical power detected by the optical detector 6 and the signal light loss threshold which is a predetermined value;
3) if the power value detected by the second optical detector 6 is smaller than the signal light loss threshold of the Raman fiber amplifier, the pump will not be powered ON, while the Raman fiber amplifier is in a non-operation state with no gain.
4) The relation between the Raman gain of the Raman fiber amplifier and average out-of-band gain of the Raman fiber amplifier are obtained, by establishing one-to-one correspondence relation with a listing method, or by a method of establishing functional relation, and are stored in the control unit 15. The listing is realized in manner of scaling. After determining the one-to-one correspondence relation between the Raman gain of the Raman fiber amplifier and the out-of-band ASE optical signal power generated from the Raman gain itself in manner of scaling, a functional relation between the Raman gain and the average out-of-band Raman gain is established by least square linear fitting or interpolation method or other fitting method, as shown in FIG. 6;
5) if the power value detected by the second optical detector 6 is greater than the signal light loss threshold of the Raman fiber amplifier, the control unit 15 controls the Raman fiber amplifier to power ON the pump;

6) if it required that the Raman gain reach a set gain, the average out-of-band Raman gain of the Raman fiber amplifier corresponding to the target gain is found, by looking up table according to the relation between the Raman gain of the Raman fiber amplifier and the average out-of-band Raman gain of the Raman fiber amplifier, or by using the functional relation between the Raman gain of the Raman fiber amplifier and the average out-of-band Raman gain of the Raman fiber amplifier;

7) out-of-band ASE power generated from EDFA in system which enters the Raman fiber amplifier is multiplied by the average out-of-band gain of the Raman fiber amplifier, thus obtaining and storing the first amendment value into the control unit.

Since the out-of-band ASE power detected by the first optical detector 5 contains the addition of the out-of-band ASE power generated from the Raman gain itself in case of controlling at a default Raman gain and the obtained first amendment value, different Raman gain corresponds to different average out-of-band gain. Thus, the influence on Raman gain control by out-of-band ASE of system is removed in practice.

According to the embodiment of the present invention, two solutions are employed to remove the influence of in-band signal interference.

Figure 2:
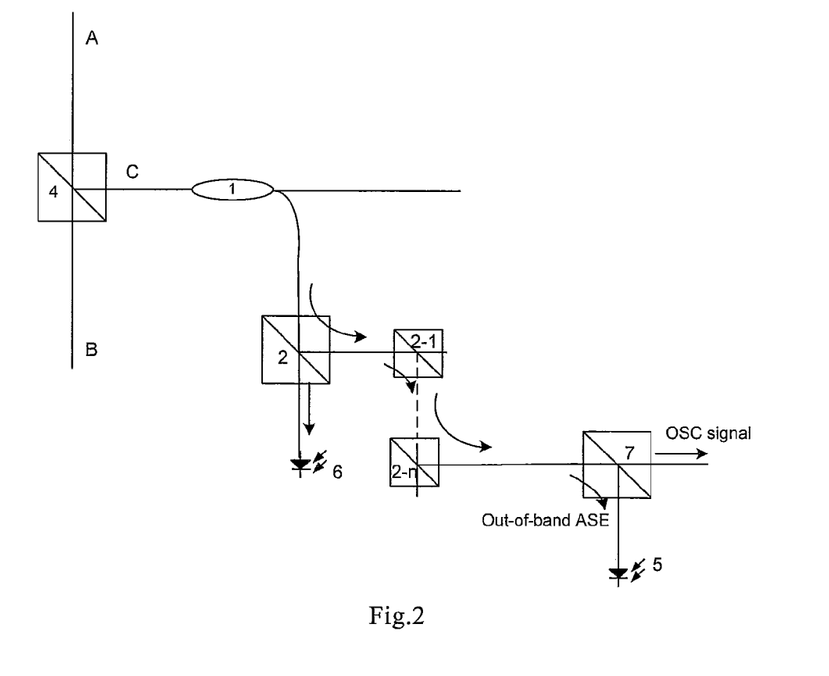
FIG. 2 is a structure diagram of adding BPF in order to increase isolation degree between in-band and out-of-band according to an embodiment of the present invention.

The first solution is that: as shown in FIG. 2, multiple same BPFs are connected in series after the reflection side of the signal filter 2, a certain BPF is placed on the reflection terminal of BPF of previous stage. Said BPFs have an operation band same with that of the signal filter 2. Said measure can suppress signal power in the operation band of the signal filter 2 interferes with ASE outside the operation band, thus lessening the influence on the detection accuracy of out-of-band ASE by insufficient isolation degree between in-band and out-of-band.

The second solution is that: if it is not preferable to connect multiple BPFs in series to increase isolation degree for lowering cost and volume, or if the isolation degree cannot meet the requirement by connecting multiple BPFs in series, the control unit 15 can calculate the magnitude of the in-band power interfered with out-of-band by means of the relation between in-band power and isolation degree. The steps therefor are as follows: the in-band power detected by the second optical detector 6 is Pin dBm, in-band/out-of-band isolation degree is i dB, the value of the isolation degree can be selected by scaling, then the in-band power interfered with out-of-band is $$10^{\frac{P_{in}-i}{10}}$$

mW, that is, the second amendment value, wherein the control unit 15 performed above calculation. Since the power is not generated from gain of the Raman fiber amplifier, when performing gain locking of the Raman fiber amplifier, the power is calculated into power value of the first optical detector 5 by the control unit 15. When performing the gain locking, out-of-band ASE optical signal power value corresponding to target gain adjusted by the control unit driving, that is, adjusted detection value of the first optical detector 5, contains power value corresponding to the gain added to the in-band power $$10^{\frac{P_{in}-i}{10}}$$

interfered with out-of-band pre-stored therein.

In order to remove the influence of in-band signal interference effectively, the first solution, the second solution, or combination thereof can be employed.

According to the embodiment of the present invention, the influence on Raman gain control by out-of-band ASE of EDFA itself in system, and the influence of in-band signal interference are removed effectively. According to the embodiment of the present invention, the standard out-of-band ASE optical signal power value calculated by the control unit, that is, the out-of-band ASE power value generated from the Raman gain itself corresponding to the target gain+the first amendment value+the second amendment value, is controlled and calculated by the control unit. The first optical detector 5 detects real-time out-of-band ASE power value, which is compared with the standard out-of-band ASE optical signal power value, after that, power of the pump laser is adjusted, making the real-time out-of-band ASE power value reach the standard out-of-band ASE optical signal power value, thus realizing target gain locking of the Raman fiber amplifier. According to the embodiment of the present invention, by the method of performing target gain locking by modifying out-of-band ASE power value, the detection accuracy of the first optical detector detecting out-of-band ASE optical signal power, thus making the Raman fiber amplifier locked to the target amplification gain required by user accurately.

When EDFA is not used in system, the influence on Raman gain control by out-of-band ASE of EDFA itself in system does not exist in the Raman fiber amplifier, while according to the embodiment of the present invention, multiple BPFs is connected in series to remove in-band signal interference. On the other hand, when the in-band signal has little influence on out-of-band signal, actual out-of-band ASE power value need not to be modified by the control unit, while only the power of the pump laser of the Raman fiber amplifier need to be adjusted, making out-of-band ASE power value reach out-of-band ASE optical signal power value corresponding to the target gain (at this time, the value is the standard out-of-band ASE optical signal power value). Thus, the target gain locking of the Raman fiber amplifier can be realized.

Finally, it should be noted that, the above embodiments are used to explain the technical solution of the present invention and the present invention should not be construed as being limited to such embodiments, although the present invention has been described in detail with reference to preferred embodiments thereof, it will be understood by those of ordinary skill in the art that various changes or equative replacements may be made to the technical solution of the present invention without departing from the spirit and scope of the present invention as defined by the following claims.

What is claimed is:

1. A method of performing target Raman gain locking, comprising:
    step 1 of extracting an optical signal from an output side of a splitting coupler (1) of a Raman fiber amplifier (9);
    step 2 of performing a first-level-bandpass filtering on the optical signal extracted in the step 1, splitting a composite out-of-band optical signal and a composite in-band optical signal with respect to a filtering operation band;
    step 3 of performing a second-level-bandpass filtering on the composite out-of-band optical signal split in step 2, to filter out a monitoring optical signal therein and extract an out-of-band ASE optical signal;

step 4 of detecting a power of the out-of-band ASE optical signal extracted in the step 3;

step 5 of determining a mathematical relation between a target gain value and the power of the out-of-band ASE optical signal generated from a Raman gain itself;

step 6 of determining a standard power the of out-of-band ASE optical signal to remove interference; and step 7 of adjusting power of a pump laser of the Raman fiber amplifier (9) by a control unit (15) of the Raman fiber amplifier (9), to make the power of the out-of-band ASE optical signal detected in the step 4 be equal to and locked to the standard power of the out-of-band ASE optical signal, wherein the step 6 further comprising substeps as follows:

step 6-1 of in case that the Raman fiber amplifier is powered ON and the pump laser thereof is powered OFF, performing the steps 1 to 4, obtaining the power of the out-of-band ASE optical signal, and at same time, detecting power Pin of the split composite in-band optical signal;

step 6-2 of comparing the power Pin of the composite in-band optical signal and a signal light loss threshold value of the Raman fiber amplifier, and controlling the OFF and ON of the pump laser of the Raman fiber amplifier (9) by the control unit of the Raman fiber amplifier, wherein when the power Pin of the composite in-band optical signal is smaller than the signal light loss threshold value of the Raman fiber amplifier (9), the pump laser remaining OFF state, otherwise the pump laser is powered ON;

step 6-3 of determining mathematical correspondence relation between target gain value of the Raman fiber amplifier (9) and an average out-of-band gain value;

step 6-4 of determining the average out-of-band gain value corresponding to the target gain value according to the mathematical correspondence relation determined in step 6-3, and multiplying it by the power of the out-of-band ASE optical signal obtained in the step 6-1, thus obtaining a first amendment value;

step 6-5 of determining a mathematical correspondence relation between the power Pin of the composite in-band optical signal obtained in the step 6-1 and in-band/out-of-band isolation degree i;

step 6-6 of obtaining a second amendment value $$10^{\frac{P_{in}-i}{10}}$$

according to the mathematical correspondence relation determined in step 6-5; and step 6-7 of adding the first amendment value obtained in the step 6-4, the second amendment value obtained in the step 6-6 and the power of the out-of-band ASE optical signal corresponding to the target gain value obtained from the mathematical relation determined in the step 5, thus obtaining the standard power of the out-of-band ASE optical signal.

2. The method as claimed in claim 1, wherein the step 6 comprising substeps as follows:

step 6-1 of in case that the Raman fiber amplifier is powered ON and the pump laser thereof is powered OFF, performing the steps 1 to 4, obtaining the power of the out-of-band ASE optical signal, and at a same time, detecting power Pin of the split composite in-band optical signal;

step 6-2 of comparing the power Pin of the composite in-band optical signal and a signal light loss threshold value of the Raman fiber amplifier (9), and controlling the OFF and ON of the pump laser of the Raman fiber amplifier (9) by the control unit (15) of the Raman fiber amplifier (9), wherein when the power Pin of the composite in-band optical signal is smaller than the signal light loss threshold value of the Raman fiber amplifier (9), the pump laser remaining OFF state, otherwise the pump laser is powered ON;

step 6-3 of determining mathematical correspondence relation between the target gain value of the Raman fiber amplifier (9) and the and an average of the out-of-band gain value;

step 6-4 of determining the average of the out-of-band gain value corresponding to the target gain value according to the mathematical correspondence relation determined in step 6-3, and multiplying it by the power of the out-of-band ASE optical signal obtained in the step 6-1, thus obtaining a first amendment value; and step 6-5 of adding the first amendment value obtained in the step 6-4 and the power of the out-of-band ASE optical signal corresponding to the target gain value obtained from the mathematical relation determined in the step 5, thus obtaining the standard power of the out-of-band ASE optical signal.

3. The method as claimed in claim 1, wherein the Raman fiber amplifier is a distributed Raman fiber amplifier (9).

4. A Raman fiber amplifier for realizing target Raman gain locking, comprising a splitting coupler (1) and a control unit (15), comprising:

a detection circuit formed by filters and optical power detectors, said detection circuit being connected between an output side of the splitting coupler (1) and an input side of the control unit (15), wherein:

a common side of a signal filter (2) is connected to a small terminal of the output side of the splitting coupler (1), a reflection side thereof is connected to a common side of a monitoring channel filter (7), a reflection side of the monitoring channel filter (7) is connected to reception side of a first optical power detector (5), an output side of the first optical power detector (5) is connected to an input side of the control unit (15), wherein the control unit comprises a target gain locking module, wherein the signal filter (2) is for extracting an optical signal from an output side of the splitting coupler of the Raman fiber amplifier, the signal filter (2) is further for performing a first-level-bandpass filtering on the extracted optical signal, splitting a composite out-of-band optical signal and a composite in-band optical signal with respect to a filtering operation band, the signal filter (2) is further for performing a second-level-bandpass filtering on the split composite out-of-band optical signal, to filter out a monitoring optical signal therein and extract an out-of-band ASE optical signal, the first optical power detector (5) is for detecting power of the extracted out-of-band ASE optical signal, wherein the target gain locking module comprises:

a first storage and conversion unit, for determining a mathematical relation between the target gain value and the power of the out-of-band ASE optical signal generated from Raman gain itself;

a standard out-of-band ASE optical signal power calculation unit, for determining a standard power of the out-of-band ASE optical signal to remove interference; and a power adjustment and power locking unit of the pump laser, for adjusting power of a pump laser of the Raman fiber amplifier by the control unit (15) of the Raman fiber amplifier, to make the power of the out-of-band ASE optical signal detected by the first optical power detector (5) be equal to and locked to the standard power of the out-of-band ASE optical signal wherein a second optical power detector (6) is connected between a transmission side of the signal filter (2) and the input side of the control unit (15), wherein the target gain locking module further comprises:

a third storage and conversion unit for storing and converting a mathematical relation between a partial power of a signal power within the filtering operation band detected by the second optical power detector (6) interfered with the first optical power detector (5) and the second amendment value;

wherein the standard out-of-band ASE optical signal power calculation unit is further for adding the power of the out-of-band ASE optical signal corresponding to the target gain value, the first amendment value and the second amendment value.

5. The Raman fiber amplifier as claimed in claim 4, wherein the target gain locking module further comprising:

an ON/OFF control unit of a pump laser; and a second storage and conversion unit for storing and converting a mathematical relation between a signal power value outside filtering operation band when the pump is powered OFF detected by the first optical power detector (5) and the first amendment value;

wherein the standard out-of-band ASE optical signal power calculation unit is further for adding the power of the out-of-band ASE optical signal corresponding to the target gain value and the first amendment value.

6. The Raman fiber amplifier as claimed in claim 4, wherein the signal filter (2) and the monitoring channel filter (7) is a BPF.

7. The Raman fiber amplifier as claimed in claim 4, wherein the filtering operation band of the signal filter (2) is a filtering operation band of the Raman fiber amplifier.

8. The Raman fiber amplifier as claimed in claim 4, wherein the filtering operation band of the monitoring channel filter (7) is an operation band without filtering the monitoring optical signal.

9. The Raman fiber amplifier as claimed in claim 4, wherein multiple signal filters (2-1, 2-2, . . . 2-n) are connected in series between the reflection side of the signal filter (2) and the common side of the monitoring channel filter (7), a common side of each of the signal filter filters is connected to a reflection side of a signal filter of previous stage, and each signal filter has a same filtering operation band.

10. The Raman fiber amplifier as claimed in claim 6, wherein the filtering operation band of the signal filter (2) is the filtering operation band of the Raman fiber amplifier.

11. The Raman fiber amplifier as claimed in claim 6, wherein an operation band of the monitoring channel filter (7) is an operation band without filtering the monitoring optical signal.

12. The Raman fiber amplifier as claimed in claim 5, wherein multiple signal filters (2-1, 2-2, . . . 2-n) are connected in series between the reflection side of the signal filter (2) and the common side of the monitoring channel filter (7), a common side of each signal filter is connected to a reflection side of a signal filter of previous stage, and each signal filter has a same filtering operation band.

13. The Raman fiber amplifier as claimed in claim 4, wherein the Raman fiber amplifier is a distributed Raman fiber amplifier.

14. The method of performing target Raman gain locking using the Raman fiber amplifier according to claim 1, wherein the Raman fiber amplifier comprises:

a splitting coupler (1) and a control unit (15), comprising:

a detection circuit formed by filters and optical power detectors, said detection circuit being connected between an output side of the splitting coupler (1) and an input side of the control unit (15), wherein:

a common side of a signal filter (2) is connected to a small terminal of the output side of the splitting coupler (1), a reflection side thereof is connected to a common side of a monitoring channel filter (7), a reflection side of the monitoring channel filter (7) is connected to reception side of a first optical power detector (5), an output side of the first optical power detector (5) is connected to an input side of the control unit (15), wherein the control unit comprises a target gain locking module, wherein the signal filter (2) is for extracting an optical signal from an output side of the splitting coupler (1) of the Raman fiber amplifier, the signal filter (2) is further for performing a first-level-bandpass filtering on the extracted optical signal, splitting a composite out-of-band optical signal and a composite in-band optical signal with respect to a filtering operation band, the signal filter (2) is further for performing a second-level-bandpass filtering on the split composite out-of-band optical signal, to filter out a monitoring optical signal therein and extract the out-of-band ASE optical signal, the first optical power detector (5) is for detecting power of the extracted out-of-band ASE optical signal, wherein the target gain locking module comprises:

a first storage and conversion unit, for determining a mathematical relation between the target gain value and the power of the out-of-band ASE optical signal generated from Raman gain itself;

a standard out-of-band ASE optical signal power calculation unit, for determining a standard power of the out-of-band ASE optical signal to remove interference; and a power adjustment and power locking unit of the pump laser, for adjusting power of a pump laser of the Raman fiber amplifier by the control unit (15) of the Raman fiber amplifier, to make the power of the out-of-band ASE optical signal detected by the first optical power detector (5) be equal to and locked to the standard power of out-of-band ASE optical signal wherein a second optical power detector (6) is connected between a transmission side of the signal filter (2) and the input side of the control unit (15).

wherein the target gain locking module further comprises:

a third storage and conversion unit for storing and converting a mathematical relation between a partial power of a signal power within the filtering operation band detected by the second optical power detector (6) interfered with the first optical power detector (5) and the second amendment value;

wherein the standard out-of-band ASE optical signal power calculation unit is further for adding the power of the out-of-band ASE optical signal corresponding to the target gain value, the first amendment value and the second amendment value.

15. The method as claimed in claim 1, the method further comprising: splitting the composite out-of-band optical signal and the composite in-band optical signal by a ratio of 10% to 90%.

16. The Raman fiber amplifier as claimed in claim 4, wherein the splitting coupler (1) splits the composite out-of-band optical signal and the composite in-band optical signal by a ratio of 10% to 90%.

* * * * *